United States Patent [19]

Johnson

[11] 4,290,725

[45] Sep. 22, 1981

[54] PARTICULATE MATERIAL TRANSFER SYSTEM

[75] Inventor: Weldon K. Johnson, Boise, Id.

[73] Assignee: Kerr-McGee Coal Corporation, Oklahoma City, Okla.

[21] Appl. No.: 81,888

[22] Filed: Oct. 4, 1979

[51] Int. Cl.³ ............................................. B65G 67/06
[52] U.S. Cl. ..................... 414/329; 141/283; 141/326; 414/291; 414/292; 414/389; 414/397
[58] Field of Search ............... 414/291, 292, 328, 329, 414/389, 397; 193/3; 105/377; 141/93, 283, 326

[56] References Cited

U.S. PATENT DOCUMENTS

| | | | |
|---|---|---|---|
| 3,194,183 | 7/1965 | Schwartz et al. | 105/377 |
| 3,235,104 | 2/1966 | Morawski et al. | 414/329 |
| 3,374,908 | 3/1968 | Giesking | 414/329 |
| 3,831,792 | 8/1974 | Waterman et al. | 105/377 X |
| 4,125,195 | 11/1978 | Sasadi | 414/328 X |

Primary Examiner—Jeffrey V. Nase
Attorney, Agent, or Firm—William G. Addison

[57] ABSTRACT

An improved particulate material loading system for transferring particulate material from a storage assembly to a vehicle having a storage bin wherein the material is protected from the outside environment during the transfer. The storage assembly includes a temporary cover which is operatively engagable with the vehicle to protect the storage bin of the vehicle when a hatch door of the vehicle is moved from a closed position to an open position to enable transfer of the material thereto. The vehicle is constructed to slidably receive the temporary cover of the storage assembly.

19 Claims, 8 Drawing Figures

PARTICULATE MATERIAL TRANSFER SYSTEM

BACKGROUND OF THE INVENTION

1. Field of the Invention

The present invention relates generally to systems for transferring particulate material and, more particularly, but not by way of limitation, to systems for transferring particulate material such as coal from an overhead storage container into railroad cars while maintaining the particulate material in a covered or protected condition.

2. Description of the Prior Art

One prior system for loading a tender car or hopper included a material distributing car rollingly supported on a trestle track, which was positioned above a railway track at a loading station. An example of a related system was disclosed in the U.S. Pat. No. 1,054,272, issued to C. C. Brackett. More particularly, as the hopper car was moved through the loading station, the distributing car was moved into overhead alignment with the hopper car. The distributing car was a "drop-bottom" type of hopper car and included a latching mechanism for preventing the inadvertent discharge of the retained material.

In some systems, unlatching devices were provided on the hopper car, or on the track supporting structures for opening the drop-bottom when positioned over the car to be loaded. Devices were utilized in some systems for returning the drop-bottom to the normally closed position after the material had been loaded. Various latching, unlatching and re-latching devices were disclosed in the U.S. Pat. Nos. 1,054,272, issued to C. C. Brackett; 1,084,481, issued to V. Ranier; 1,196,289, issued to W. H. and J. T. Rice; and 2,634,871, issued to R. A. Cline et al.

Other systems for the overhead discharging of particulate material into hopper cars were disclosed in the U.S. Pat. Nos. 2,238,200, issued to B. Willeke, and 3,374,908, issued to P. F. Giesking.

The Willeke patent disclosed a relatively long, horizontal overhead storage bunker utilized in charging lorries of coke ovens. In this particular system, the storage bunker had slotted openings at the bottom. The slotted openings were relatively small, and thus chunked coal retained in the bunker would not normally discharge through such slotted openings. A scraper plate assembly was connected to the upper portion of the coal hoppers and, as a lorry was moved on a track below the storage bunker, the scraper assemblies (disposed in the slotted openings) scraped the coal from the bunker and into the coal hopper.

In the Giesking patent, a relatively large storage container was positioned above a track at a loading station. A plurality of discharge outlets were formed at the bottom of the storage container. As a train of hopper cars moved through the loading station, each car was progressively loaded. Hatch covers were provided on each car to maintain the hoppers in a normally covered position. A hatch unlatching device was provided near the track at the loading station for successively placing each car in an open position to receive some of the material form the discharge outlets. A hatch closing and relating mechanism was provided to return the hatch doors to the normally closed position after the loading operation had been completed. The loading was controlled by the engagement between a guide portion of the hopper car and a cam-like actuating device which was positioned at track side. The hopper car was supported on a wheeled truck by load absorbing springs. As a hopper car progressively was loaded, it settled upon the springs until the guide portion disengaged from the cam-like actuating device which was positioned at track side.

In the prior art systems, the material was not covered continuously during the loading operation. Thus, the particulate material was exposed to moisture or water (in the form of rain, snow, and the like) or blowing dust and debris, for example. This is particularly undesirable when the particulate material is in a dried or purified form.

SUMMARY OF THE INVENTION

The present invention relates to a particulate material transfer system for automatically loading a quantity of dried or processed particulate material into the storage bin of a vehicle moving on a track or path. During the loading operation, the particulate material is continuously covered, thereby protecting such material from the detrimental effect of the surrounding outside environment.

The system of the present invention allows a train of the vehicles to maintain a relatively normal, efficient traveling rate during the loading operation. In addition, the present system functions in a substantially automated manner and thus the number of personnel required to operate the present system is substantially reduced.

DESCRIPTION OF THE PREFERRED EMBODIMENT

In the course of loading processed particulate materials, such as dried coal and purified chemicals, for example, it is often desirable and sometimes imperative that the material be maintained in a covered condition. In this manner, the material remains protected from the surrounding environment (rain, snow, sleet, dust and blowing debris, for example). If the particulate material is not maintained in a protected or covered position, or is exposed to the effects of adverse weather conditions, the material could become contaminated or otherwise reduced to an unusable state. In any event, the material might have to be reprocessed or, at least, allowed to dry, which would result in additional expenditure of time and money.

Processed particulate material, such as generally referred to above, is often transported by transport vehicles, such as railroad cars. By coupling a number of vehicles together in the form of a train, relatively large quantities of processed particulate material can be transported from one location to another location in a convenient manner.

In some applications, the particulate material is loaded into vehicles (or hopper cars) by an overhead loading apparatus which is positioned near the transport route (or railroad track). The location where the material is loaded into the vehicles is being referred to herein as a "loading station". In this type of application, the particulate material is moved to a position generally above the transport route by a conveyor like apparatus and, when one of the vehicles is positioned below the overhead loading apparatus, the material is caused to fall into a storage bin portion formed in the vehicle.

It also is desirable that the traveling rate of the vehicle train be relatively fast as the railroad cars move through the loading stations. The efficiency and economy of the loading operation are enhanced greatly when the train of vehicles can be moved through the loading station while automatically actuating the mechanisms controlling the loading of the particulate material.

Referring to the drawings in general and to the FIGS. 1-4 in particular, shown therein and designated by the general reference numeral 10 is an improved loading system which is constructed in accordance with the present invention. The loading system 10 is utilized for automatically transferring a quantity of particulate material 12 (shown in FIG. 3) from an overhead loading apparatus 14 at a loading station 16 into a transport vehicle in the form of a railroad car 18 while the car 18 is being moved in a first direction 20 on a transport route in the form of a railroad track 22. The loading system 10 is constructed to maintain the material 12 in a covered condition, substantially protected from the detrimental effects of the surrounding environment during the loading operations.

It will be apparent to those skilled in the art that the present invention contemplates a plurality of railroad cars 18 being moved through the loading station 16 in the form of a train.

Figure 1:
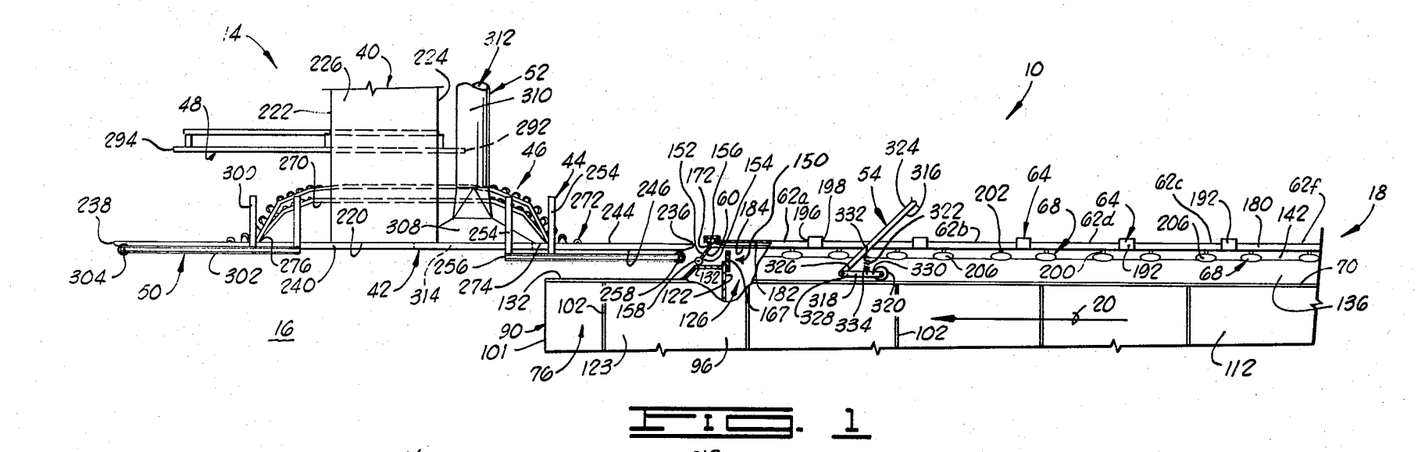
FIG. 1 is a side elevational view of the loading apparatus of the present invention showing a portion of a railroad car entering a loading station.

As shown in FIG. 1, the loading system 10 generally comprises a plurality of assemblies, apparatus and components which form portions of both the overhead loading apparatus 14 and the railroad car 18, and cooperate to effectuate the loading operation as the railroad car 18 passes through the loading station 16. The overhead loading apparatus 14 generally comprises: a loading chute 40, a temporary cover 42, an unlatching assembly or mechanism 44, a hatch door guide assembly 46, a hatch door positioning rail 48, a relatching assembly or mechanism 50, and an exhaust system 52. Near the arrival end of the loading station 16 (the end portion of the loading station 16 first entered by the railroad car 18), a load control mechanism 54 is positioned alongside the track 22 at a predetermined height generally above the track 22. For clarity, the unlatching mechanism 44 and the relatching mechanism 50 are not shown in FIGS. 2, 3 and 4, the load control mechanism 54 is not shown in FIGS. 2 and 4, and the overhead loading apparatus 14 is not shown in FIG. 7.

Figure 8:
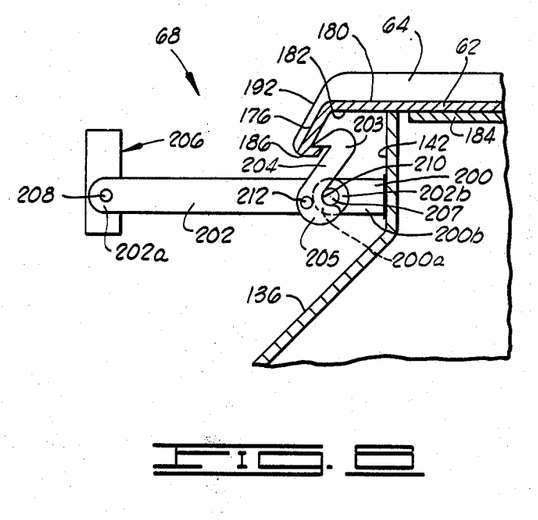
FIG. 8 is a partial broken, cross-sectional view of one of the latch assemblies of the railroad car.

The loading system 10 comprises: a cover entry gate 60, a plurality of hatch doors 62 (the individual hatch doors being designated 62a, 62b, 62c, 62d, 62e and 62f in the drawings), a plurality of door seals 64, (only some of the door seals 64 being designated via a reference numeral in the drawings), a cover exit gate 66, a plurality of door latch assemblies 68 (only some of the door latch assemblies 68 being designated via a reference numeral in the drawings and a typical door latch assembly 68 being shown in more detail in the FIG. 8), and a load control surface 70 formed on a side portion of the car 18.

The car 18 generally comprises: a body 76, a first truck 78 and a second truck 80. The body 76 is semirigidly supported upon the first and second trucks 78 and 80 via first and second load absorbers 82 and 84, respectively. The first and second trucks 78 and 80 are positioned on the track 22 for rolling movement via a plurality of wheels 86 which are journally supported via axles 88. The body 76 is rollingly supported on the track 22 via the trucks 78 and 80 and the wheels 86. In one form, the load absorbers 82 and 84 are coil springs, and function to permit the height of the load control surface 70 to be selectively positioned in relation to a portion of the load control mechanism 54. In other words, as the railroad car 18 is progressively loaded with the material 12, the body 76 is lowered a predetermined distance via the load absorbers 82 and 84.

The car 18 has a leading first end 90 and a trailing second end 92. In other words, when the car 18 is moving in the first direction 20, the leading first end 90 moves into the arrival end of the loading station 16 in advance of the trailing second end 92. Further, the car 18 has a first side 96, an opposed second side 98, an upper side 99, an opposed lower side 100, a first end 101 and an opposed second end 103.

A plurality of uprights 102 are positioned on the first and opposed second sides 96 and 98 of the body 76. Each upright 102 extends a distance vertically upwardly along the first and opposed second side 96 and 98 and the uprights 102 are positioned so as to be in a substantially parallel, spaced-apart relationship with respect to the other uprights 102. The first side 96 has an inner surface 110 and an outer surface 112, a portion of the outer surface 112 being connected to the inner portion of the uprights 102. Similarly, the opposed second side 98 of the body 76 has an inner surface 114 and an outer surface 116, a portion of the outer surface 116 being connected to the inner portion of the uprights 102. The first and opposed second sides 96 and 98 and extend from the first end 101 to the opposed second end 103 of the car 18 in a longitudinal manner, and the first and second end walls 101 and 103 are formed at the first leading end and trailing second ends 90 and 92, respectively, of the car 18. The uprights 102 are utilized to reinforce the first and opposed second sides 96 and 98 of the body 76 and to enhance the structural integrity of the car 18.

The body 76 of the car 18 is further provided with a first bulkhead 122 in the forward or leading end portion 123 of the body 76, the first bulkhead 122 being disposed between the first side 96 and the opposed second side 98 of the body members 76 and secured thereto in a substantially upright position; and a second bulkhead 124 in the rearward or trailing end portion 125 of the body 76, the second bulkhead 124 being disposed between the first side 96 and the opposed second side 98 of the body member 76 and secured thereto in a substantially upright position. The first and second bulkheads 122 and 124, which are thus maintained in a substantially parallel, spaced apart relationship, cooperate with the portion of the first and opposed second sides 96 and 98 and the lower side 100 of the body 76 positioned between the first and second bulkheads 122 and 124 to form a storage bin 126 in the car 18 for receiving and holding the particulate material 12.

The upper side 99 of the car 18 includes a first end ceiling member 132 extending between the first side 96 and the opposed second side 98 of the body 76 and positioned near the leading first end 90; second end ceiling member 134 extends between the first side 96 and the opposed second side 98 and positioned near the trailing second end 92; first side ceiling member 136 extending between the end ceiling members 132 and 134 and sloping a distance inwardly and upwardly from the uppermost portion of the first side 96; and second side ceiling member 138 extending between the end ceiling members 132 and 134 and sloping a distance upwardly and inwardly from the uppermost portion of the opposed second side 98. The upper side 99 further includes a first side plate 142 connected to the uppermost portion of the first side ceiling member 136, the plate 142 extending longitudinally substantially the length of the first side ceiling member 136; and a second side plate 144 connected to the uppermost portion of the second side ceiling member 138, the plate 144 extending substantially the length of the second side ceiling member 138.

The ceiling members 132, 134, 136 and 138 thus cooperate to form the ceiling, top or upper side 99 of the car 18 and the members 132, 134, 136 and 138 are positioned and cooperate to form a cover receiving opening 150 in the car top 18. During one aspect of the loading operation, the temporary cover 42 is slidingly positioned within the cover receiving opening 150, in a manner to be described in greater detail below.

Figure 2:
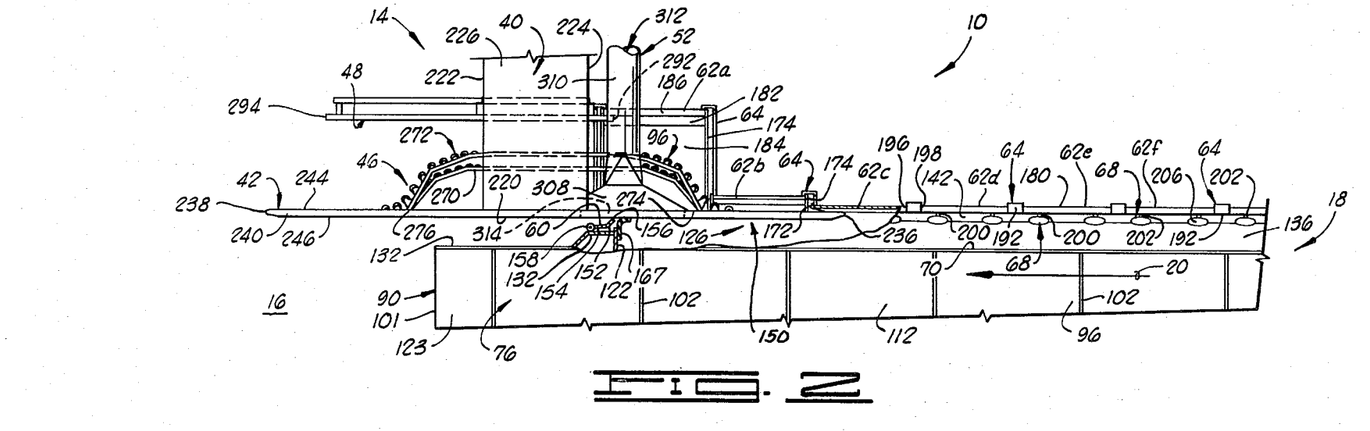
FIG. 2 is a side elevational view of the loading apparatus of the invention in combination with a portion of a railroad car during an initial phase of the loading operation.
Figure 3:
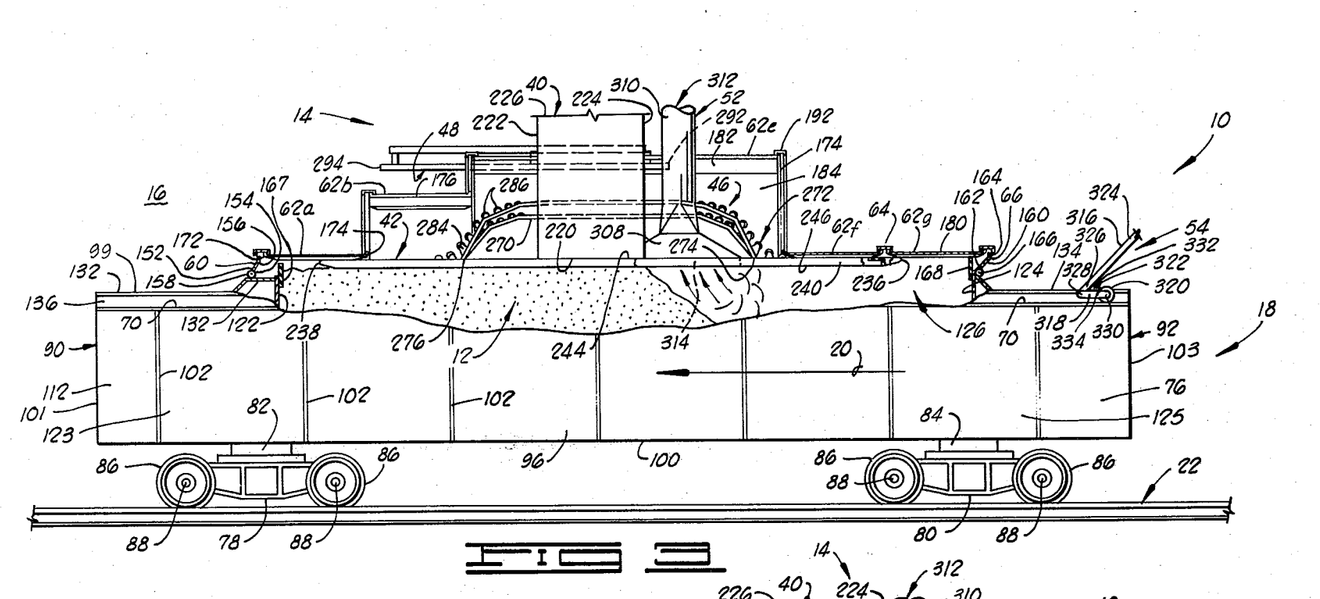
FIG. 3 is a partially broken, side elevational view of the loading apparatus and the railroad car during another phase of the loading operation, subsequent to the phase shown in FIG. 2.

The cover entry gate 60 is pivotally connected to a portion of the first end ceiling member 132 generally between the portions of the first and second side plates 142 and 144. The cover entry gate 60 has a normally closed first position, as shown in FIG. 3, and an opened second position, as shown in FIG. 2. The length of the cover entry gate 60 is approximately equal to the distance between the first and second side plates 142 and 144. In the closed first position of the cover entry gate 60, one end portion of the cover receiving opening 150 is substantially closed via the cover entry gate 60.

The cover entry gate 60 is aligned with the temporary cover 42 during the loading of the car 18 and is utilized to facilitate in the positioning or insertion of the temporary cover 42 within the cover-receiving opening 150. The cover entry gate 60 includes a member 152 having a first end 154 and an opposed second end 156 and a coil spring 158. The first end 154 of member 152 is pivotally attached to the ceiling member 132 through the spring 158 by means (not shown). The member 152 extends upwardly from the first ceiling member 132 so that the opposed second end 156 of the member 152 operatively engages the door seal 64. The cover entry gate 60 is maintained in the closed first position via the coil spring 158 in cooperation with one of the door seal 64, and the cover entry gate 60 is moved from the closed first position to the open second position via engagement with the temporary cover 42.

Figure 4:
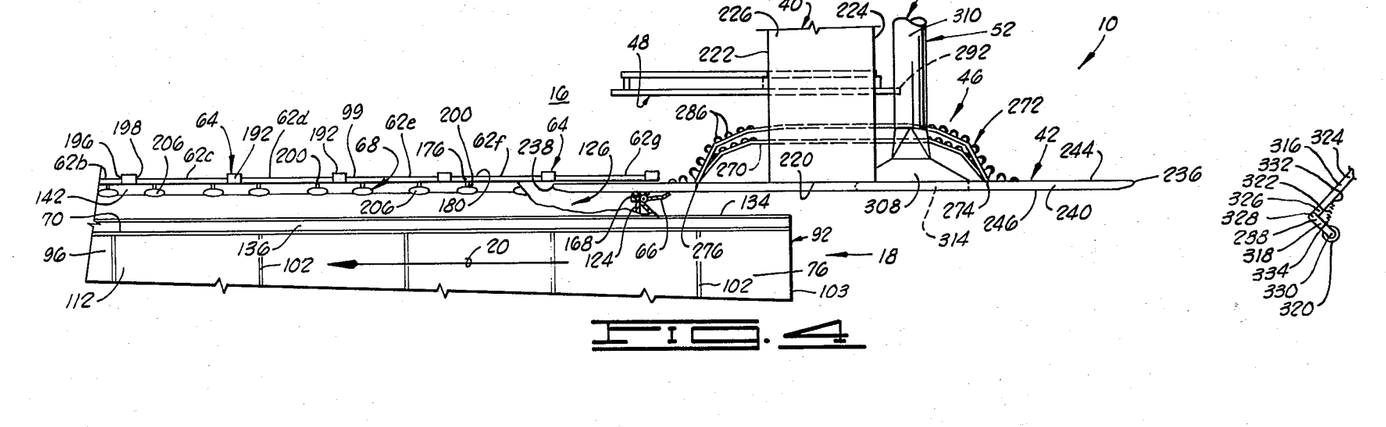
FIG. 4 is a side elevational view of the loading apparatus showing a portion of the railroad car departing from the loading station.

The cover exit gate 66 is constructed similar to the cover entry gate 60. The cover exit gate 66 includes a member 160 having a first end 162 and an exposed second end 164 and a coil spring 166. The first end 162 of the member 160 is pivotally attached to the second end ceiling member 134 through the coil spring 166 by means not shown. The member 160 extends upwardly from the second end ceiling member 134 so that the opposed second end 164 of the member 160 operatively engages one of the door seals 64. The cover exit gate 66 has a normally closed first position, as shown in FIG. 3, and an opened second position, as shown in FIG. 4. In the closed first position, the cover exit gate 66 substantially closes one end portion of the cover receiving opening 150. The cover exit gate 66 is maintained in the closed first position via the coil spring 166 in cooperation with one of the door seals 64, in a manner similar to that described before with respect to the gate 60. The cover exit gate 66 is aligned with the temporary cover 42 during the loading of the car 18, and the cover exit gate 66 facilitates the removal of the temporary cover 42 from the cover receiving opening 150 near the end of the loading operation. For this purpose, the cover exit gate 66 moves from the closed first position to the opened second position when the cover exit gate 66 is engaged by the temporary cover 42, as will be described in greater detail below.

A closure flap 167 is connected to an upper portion of the first bulkhead 122 and a similar closure flap 168 is connected to an upper portion of the second bulkhead 124. The flaps 167 and 168 each extend a distance upwardly into and transversely across the cover receiving opening 150, in an upright position (shown in FIGS. 1 and 3) of the flaps 167 and 168. The flaps 167 and 168 are constructed of a resilient material, such as rubber. Furthermore, the flaps 167 and 168 are each aligned with the temporary cover 42 for engagement with the temporary cover 42 during the loading of the car 18. As the car 18 moves through the loading station 16, the flaps 167 and 168 sequentially engage the temporary cover 42 and thereby are moved to a folded position (shown in FIGS. 2 and 4). The flaps 167 and 168 cooperate to seal the storage bin 126 from the surrounding outside environment during the loading of the car 18.

Figures 5, 6, 7:
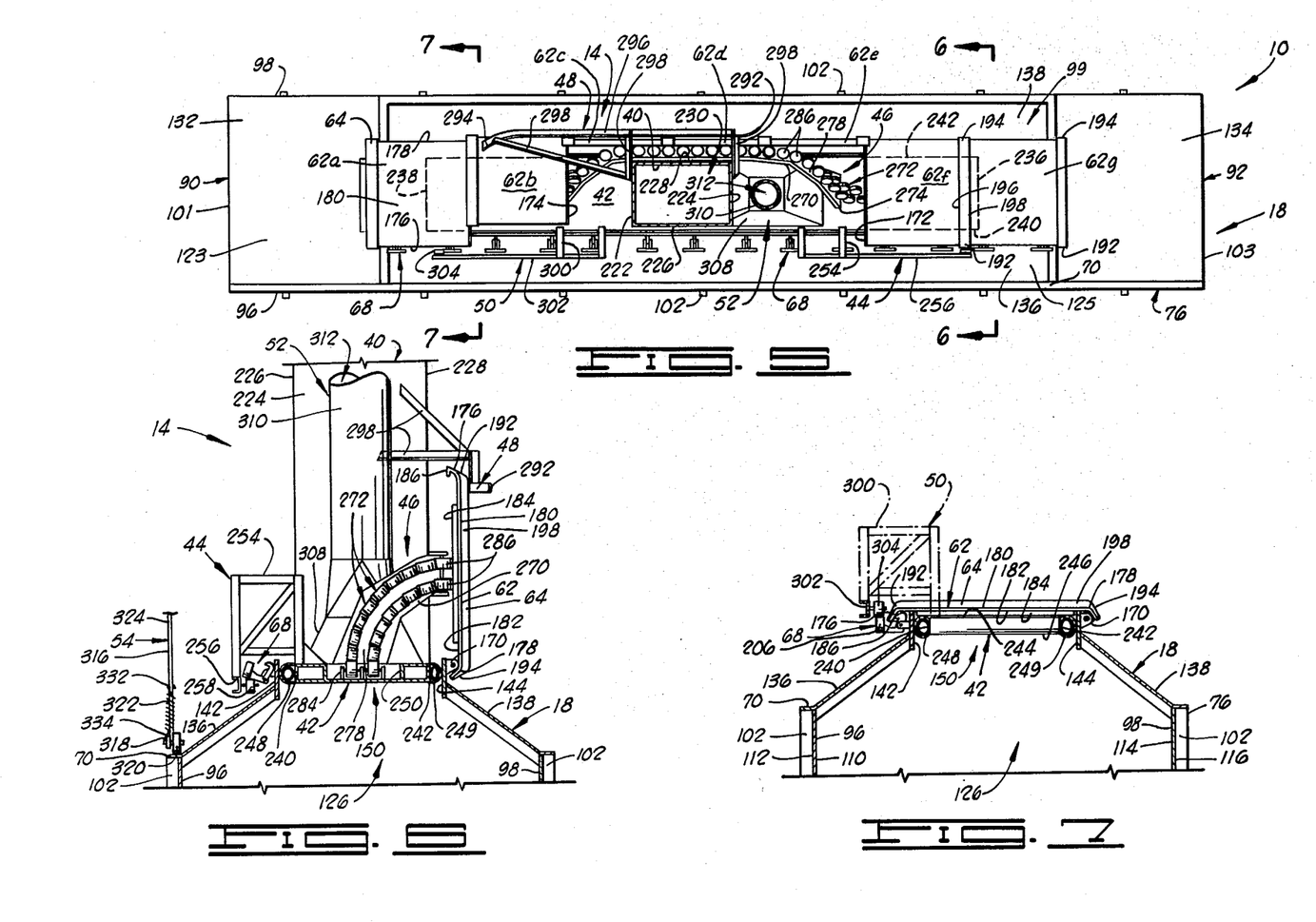
FIG. 5 is a plan view of the overhead loading apparatus and the railroad car.
FIG. 6 is a partial sectional view taken generally along the line 6—6 of FIG. 5.
FIG. 7 is a partial sectional view taken generally along the line 7—7 of FIG. 5.

Each hatch door 62 is pivotally connected to an outer portion of the second side plate 144 via a conventional hinge assembly 170 (shown in FIGS. 6 and 7). Each hatch door 62 has a normally closed covering position (shown in FIG. 7) and an opened or clearing position (shown in FIG. 6). In the closed position, each hatch door 62 substantially rests upon corresponding upper portions of the first and second side plates 142 and 144, and covers a portion of the cover-receiving opening 150, the hatch doors 62 cooperating with the first and second side plates 142 and 144 and the cover entry and exit gates 60 and 66 to substantially enclose the cover receiving opening 150. Thus, the hatch doors 62 cover a portion of the storage bin 126 beneath the receiving opening 150.

As shown in FIGS. 5, 6 and 7, each hatch door 62 has a first end 172 facing generally toward the leading first end 90 of the car 18, and an opposed second end 174 facing generally toward the trailing second end 92 of the car 18. Each hatch door 62 also has a first side 176, a second side 178, an outer face 180, and an inner face 182.

As shown in FIG. 3 with respect to the first hatch door 62a, the first and second ends 172 and 174 of each of the hatch doors 62 are flanged outwardly from the outer surface 180. The flanged end portions of each of the hatch doors 62 cooperate with the door seals 64 to facilitate in further covering and sealing the storage bin 126.

As shown more clearly in FIGS. 6 and 7, the first and second sides 176 and 178 of each hatch door 62 are flanged inwardly from the inner face 182. In the closed or covering position of the hatch doors 62, the flanged side portions extend generally downwardly toward the first and second side ceiling members 136 and 138, respectively, to cooperate in covering and sealing the storage bin 126. Further, the flanged portion of each first side 176 facilitates in the locking of one of the hatch doors 62 via one of the door latch assemblies 68, and the flanged portion of each second side 178 facilitates in pivotally connecting one of the hatch doors 62 to the hinge assembly 170.

In addition, the inner face 182 of each hatch door 62 has a contoured enlargement 184 formed on a medial portion thereof and extending from near the first end 172 to near the opposed second end 174 of the respective hatch door 62. The contoured enlargements 184 cooperate with the hatch door guide assembly 46 to facilitate in the opening and closing of the hatch doors 62 during the loading operation.

A lip 186 is formed on the flanged portion of the first side 176 of each hatch door 62, each lip 186 facing generally toward the first side plate 142 when the hatch doors 62 are in the closed position. As can be seen more clearly in FIG. 8, the lips 186 cooperate with the latching assemblies 68 to facilitate in the locking of the hatch doors 62.

As can be seen more clearly in FIGS. 2 and 3, when adjacent hatch doors 62 are in a closed position, the respective hatch doors 62 are effectively joined at adjacent end portions, each hatch door 62 being effectively joined to the adjacent hatch doors 62. However, because of the flanged nature of the adjacent end portions, a relatively small space exists between adjacent hatch doors 62 when the hatch doors 62 are in the closed position. For example, in FIG. 2, one of the spaces is depicted between the second end 174 of the hatch door 62b and the first end 172 of the adjacent hatch door 62c. Even though these spaces are relatively small, a substantial quantity of rain or blowing dust could enter the storage bin 126 via these spaces, unless the spaces were maintained in a covered position. Also, unless the spaces are covered, dust and other small particles from the particulate material 12 could be forced out of the storage bin 126 via these spaces during the loading operation. The door seals 64 are utilized to maintain these spaces covered when the hatch door 62 are in the closed position.

Each door seal 64 has a first end 192, an opposed second end 194, a first side 196 and an opposed second side 198. The opposed second end 194 of each door seal 64 is pivotably, connected to a portion of the hinge assembly 170 (shown in FIG. 5 for one of the door seals 64). The first and opposed second ends 192 and 194 of the door seals 64 are flanged in a manner corresponding to the flanged portions of the first and second sides 176 and 178 of the hatch doors 62, as shown more clearly in FIG. 7.

As shown more clearly with respect to the door seal 64 covering the space formed between hatch doors 62f and 62g in FIG. 3, as well as the space between the first end 172 of the hatch door 62a and the cover entry gate 60, and between the opposed second end 174 of the hatch door 62g and the cover exit gate 66, respectively, each door seal 64 is generally U-shaped having an inner space extending generally between the first end 192 and the opposed second end 194, and between the first side 196 and the opposed second side 198. In a closed position of the door seal 64 and adjacent hatch doors 62, the door seal 64 is positioned in a covering manner over the space between the adjacent hatch doors 62 with the corresponding flanged end portions of the adjacent hatch doors 62 being disposed in the inner space of the door seal 64.

Each of these spaces also is normally covered via one of the door seals 64. The cover entry gate 60 and the cover exit gate 66 are maintained in the closed first positions via the respective door seals 64 in cooperation with the springs 158 and 166 and the members 152 and 166 which bias the cover entry and exit gates 60 and 66 toward the closed first position.

Referring to FIG. 8, each door latch assembly 68 is operably connected to an outwardly facing portion of the first side plate 142. In one embodiment, there are two latch assemblies 68 utilized to maintain each hatch door 62 in a locked closed position.

Referring to FIG. 8, each door latch assembly 68 is operably connected to an outwardly facing portion of the first side plate 142. In one embodiment, there are two latch assemblies 68 utilized to maintain each hatch door 62 in a locked position.

Each door latch assembly 68 comprises a support post 200, a first arm 202, a second arm 204, and a load control follower 206. The support post 200 is provided with a first end portion 200a and an opposed end portion 200b. The support post 200 is connected to a portion of the first side plate 142 via the opposed second end portion 200b such that the support post 200 extends outwardly from the first side plate 142. The first arm 202 is provided with a first end portion 202a and an opposed second end portion 202b. The opposed second end portion 202b of the first arm 202 is pivotally connected to the first end portion 200a of the support post 200 by any suitable means, such as a pin 207. The first end portion 202a of the first arm 202 is pivotally connected to the load control follower 206 by any suitable means, such as a pin 208.

As illustrated in FIG. 8, the first arm 202 and the support post 200 are connected such that they have a common horizontal axis.

The second arm 204 is provided with a hooked first end portion 203, an opposed second end portion 205, and a recessed portion 210 formed in a side portion disposed adjacent the first sideplate 142. The second arm 204 is pivotally connected to the opposed second end portion 202b of the first arm 202 by any suitable means, such as pin 211, such that the recessed portion 210 engages the pin 207 when the hooked first end of the second arm 204 engages the lip 186 of the hatch door 62 to maintain the hatch door 62 in the locked position as depicted in FIG. 8. On the other hand, when the door latch 68 is moved to the unlocked second position (as depicted in FIG. 6), by the unlatching mechanism 44, the second arm 204 is rotated about the pin 207 via the recessed portion 210.

As previously stated, each door latch assembly 68 can be moved from a locked first position, as shown in FIG. 8, to an unlocked second position, as shown in FIG. 6, by unlatching mechanism 44. When the door latch assembly 68 is in the locked first position the hatch door 62 is in a locked closed position; whereas, when the door latch assembly 68 is in the unlocked second position the hatch door 62 is in an unlocked closed position and can be moved from the unlocked closed position to the open position by the hatch door guide assembly 46.

As the car 18 moves into the loading station 16 for the transfer of the material 12 to the car 18, each door latch assembly 68 is successively moved from the locked first position to the unlocked second position by the unlatching mechanism 44 and the corresponding hatch doors 62 are opened by hatch door guide assembly 46. After the transfer of the material 12 has been accomplished, the hatch doors 62 are closed and the respective door latch assemblies 68 are successively moved from the unlocked second position to the locked first position by the relatching mechanism 50 to lock the hatch doors 62 as the car 18 moves out of the loading station.

When the door latch assembly 68 is in the locked first position, the load control surface follower 206 is positioned in engaging alignment with a portion of the unlatching mechanism 44. Also, when the door latch assembly 68 is positioned in the unlocked second position the load control surface follower 206 is positioned in engaging alignment with a portion of the relatching mechanism 50.

The load control surface 70 is formed generally along the uppermost portion of the first side 96 of the body 76 of the car 18 near the first side ceiling member 136 and extends from near the leading first end 90 of the car 18 to near the trailing second end 92 of the car 18. Furthermore, the load control surface 70 is positioned in engaging alignment with a follower portion of the load control mechanism 54. The load control surface 70 cooperates with the load control mechanism 54 (the load control mechansim being interconnected to the control gate to control the flow of the particulate material into the car 18) to sense the gap between two adjacent cars 18.

Referring again to FIGS. 1 through 6, the loading chute 40 depends a distance from a supportive portion (not shown) of the overhead loading apparatus 14. The loading chute 40 has an upper end (not shown) and a lower end 220 having a generally rectangularly shaped in cross-section, a first end face 222 facing generally in the direction 20, a second end face 224 facing opposite the direction 20, a first side face 226 and an opposed second side face 228. The first side face 226 and the opposed second side face 228 are disposed between the first and second end faces 222 and 224. In addition, a material flow channel 230 is formed through the loading chute 40. The flow channel 230 is normally open to the atmosphere at the lower end 220 of the loading chute 40 and extends generally upwardly to a portion (not shown) of the overhead loading apparatus 14 where the particulate material 12 is selectively introduced into the flow channel 230 during the loading operation. The particulate material 12 introduced into the flow channel 230 falls through the flow channel 230. The introduction of the particulate material 12 into the flow channel 230 is timed in a predetermined manner with the rate of travel of the car 18 so that the storage bin 126 will be positioned below the loading chute 40 when the falling particulate material 12 discharges from the flow channel 230.

The temporary cover 42 is connected to the lower end 220 of the loading chute 40 and substantially depends therefrom in parallel, longitudinal alignment with a portion of the railroad track 22 extending through the loading station 16. The temporary cover 42 has a first end 236 positioned near the arrival portion of the loading station 16, and an opposed second end 238 positioned near the departure portion of the loading station 16. The cover 42 also has a first side 240 near the first side face 226 of the loading chute 40, and an opposed second side 242 near the opposed second side face 228 of the loading chute 40. The first and opposed second sides 240 and 242 of the temporary cover 42 extends a distance between the first and opposed second ends 236 and 238 of the temporary cover 42 and are spaced apart at a predetermined distance. As can be seen more clearly in FIG. 7 the distance between the first and opposed second sides 240 and 242 of the temporary cover 42 is less than the distance between the first and opposed second side plates 142 and 144 of the upper side 99 of the car 18 for reasons to be made more apparent hereinafter.

The temporary cover 42 also has an upper face 244 and a lower face 246 spaced a distance from the upper face 244. The upper face 244 and the lower face 246 generally extend longitudinally between the first end 236 and the opposed second end 238, and transversely between the first and second opposed sides 240 and 242 of the temporary cover 42. The distance between the upper and lower faces 244 and 246 generally defines the depth of the temporary cover 42 and the depth of the temporary cover 42 is less than the depth of the cover-receiving opening 150.

A first cover seal 248 is connected to the first side 240 of the cover 42, and a similar second cover seal 249 is connected to the second side 242 of the cover 42. The first and second cover seals 248 and 249 extend generally between the first and opposed second ends 236 and 238 of the temporary cover 42 and the distance across the first and second cover seals 248 and 249, in an assembled position with the temporary cover 42, is slightly greater than the distance between the first and second side plates 142 and 144 of the car 18. The first and second cover seals 248 and 249 are constructed of a resilient material, such as rubber.

A flow opening (not shown) is formed through a medial portion of the temporary cover 42 so as to intersect the upper and lower faces 244 and 246 of the temporary cover 42. The lower end 220 of the loading chute 40 is connected to the upper face 244 of the temporary cover 42 so that the flow opening formed through the medial portion of the temporary cover 42 is in fluid communication with the flow channel 230 of the loading chute 40 when the loading chute 40 and the temporary cover 42 are in an assembled position. An exhaust opening (not shown) is also formed through a medial protion of the temporary cover 42, the exhaust opening intersecting the upper and lower faces 244 and 246 of the temporary cover 42. The exhaust opening is positioned within the temporary cover 42 so as to be in close proximity to the flow opening within the temporary cover 42 and the second end face 224 of the loading chute 40. A first housing 250 is formed within a medial portion of the temporary cover 42 between the loading chute 40 and the first end 236 of the temporary cover 42. The first housing 250 intersects the upper face 244 of the temporary cover 42 and extends to near the lower face 246 of the temporary cover 42, as can be seen more clearly in FIG. 6. The lower portion of the first housing 250 is generally defined by a first support surface 252. A similar second housing (not shown) is formed within a medial portion of the temporary cover 42 generally between the loading chute 40 and the opposed second end 238 of the temporary cover 42. The lower portion of the second housing is generally defined by a second support surface (not shown).

The unlatching mechanism 44 comprises a braced supportive frame 254, desireably constructed of a plurality of rigid members such as angle iron components, an extension arm 256, and a latch positioning wheel 258. The frame 254 is connected to the temporary cover 42 near a medial portion of the first side 240 of the temporary cover 42. A portion of the frame 254 extends outwardly and away from the first side 240 of the temporary cover 42.

The extension arm 256 is maintained in a parallel, spaced-apart relationship with the first side 240 of the temporary cover 42 and the extension arm 256 extends from a cantilevered portion of the frame 254 in a horizontal direction towards the first end 236 of the temporary cover 42. The latch positioning wheel 258 is journally supported by the extension arm 256 at a predetermined position near the first end 236 of the temporary cover 42. The latch positioning wheel 258 is positioned in engaging alignment with the load control surface followers 206 of the door latch assemblies 68. In other words, as the car 18 moves into the arrival end of the loading station 16, the load control surface follower members 206 successively strike the latch positioning wheel 258. The door latch assemblies 68 are thereby moved from the locked first position to the unlocked second position. For example, the load control surface follower 206 of a first door latch assembly 68a (shown in FIG. 5) positioned nearest the first end 90 of the car 18 (and associated with the first hatch door 62a) is the first load control surface follower 206 to strike the latch positioning wheel 258, with the other load control surface followers 206 striking the wheel 258 in succession thereafter. Since the latch positioning wheel 258 is journally connected to the extension arm 256, very little wear will occur because of the striking engagement of the load control surface followers 206 and the latch positioning wheel 258.

The hatch door guide assembly 46 generally includes a supportive frame 270 and a plurality of roller assemblies 272. The supportive frame 270 has a first end 274, a second end 276, and an outer face 278. The first end 274 of the frame 270 is connected to the upper face 244 of the temporary cover 42 between the first housing 250 and the loading chute 40 and in close proximity to the first housing 250. The second end 276 of the frame 270 is connected to the upper face 244 of the cover between the second housing (not shown) and the loading chute 40 in close proximity to the second housing. The supportive frame 270 extends upwardly in a curved manner between the first and second ends 274 and 276 thereof so as to facilitate and be compatible with the opening and closing of the hatch doors 62.

Referring more specifically to FIG. 6, each roller assembly 272 comprises three support plates 284 and two roller wheels 286. The three support plates 284 are secured in a parallel, spaced-apart relationship to the outer face 278 the support frame 270. The two wheels 286 forming a portion of each roller assembly 272 are journally supported in a conventional manner by three of the support plates 284.

Referring again to FIGS. 1 through 6, a door guide surface is formed by the outer peripheral surfaces of the roller wheels 286. The door guide surface extends a distance from a first pair of roller wheels 286 positioned within the first housing 250 to a second pair of roller wheels 286 positioned within the second housing. In addition, the door guide surface has a width generally defined via the distance across a pair of the roller wheels 286. Thus, the door guide surface extends from the first housing 250 to the second housing in a near-parallel relationship with the outer face 278 of the supportive frame 270. The door guide surface is not a tangible, continuous surface, but a result of the predetermined positioning of the roller wheels 286. The hatch doors 62 substantially travel upon the door guide surface formed by the wheels 286. The hatch doors 62 substantially travel upon the door guide surface formed by the wheels 286 as the car 18 moves through the loading station 16.

As shown in FIG. 5, the hatch door positioning rail 48 includes an outwardly curved first end 292, an inwardly curved second end 294, and a relatively straight, horizontal disposed medial portion 296 extending between the first and second ends 292 and 294. The hatch door positioning rail 48 is supported in a stationary position a distance above the temporary cover 42 and a distance from the second side face 228 of the loading chute 40 by a plurality of rigid strut members 298 which are secured to the loading chute 40.

Referring now to FIGS. 5 and 7, the relatching mechanism 50 is connected to the opposed second end 238 of the temporary cover 42. The relatching mechanism 50 comprises a braced frame 300, an extension arm 302, and a latch positioning wheel 304. The frame 300 is connected to the upper face 244 of the temporary cover 42 adjacent the first side 240 of the temporary cover 42 so that a portion of the frame 300 extends from the first side 240 of the temporary cover 42 in a substantially cantilevered manner similar to that of the frame 254 of the unlatching mechanism 44.

The extension arm 302 is maintained in a parallel spaced-apart relationship with the first side 240 of the temporary cover 42 and the extension arm 302 extends a distance from a cantilevered portion of the frame 300 towards the second end 238 of the temporary cover 42.

The latch positioning wheel 304 is journally supported by the extension arm 302 near the end of the extension arm 302 opposite the brace 300. The wheel 304 is positioned between the extension arm 302 and the temporary cover 42 in engaging alignment with the load control surface followers 206 of the door latch assemblies 68. Thus, as the car 18 moves through the loading station 16, the load control surface followers 206 of the latch assemblies 68, which are in an unlocked second position, successively strike the latch positioning wheel 304 of the relatching mechanism so that the respective latch assemblies 68 are secured in the locked first position.

Referring now to FIGS. 1 through 6, the exhaust system 52 comprises a hood 308, an exhaust duct 310, and a vacuum apparatus (not shown) disposed within a supportive structure (not shown) of the overhead loading apparatus 14. The hood 308 is connected to the temporary cover 42 so as to be in fluid communication with the exhaust opening 314 (shown partially by phantom lines in FIGS. 1, 2, 3 and 4), formed through the temporary cover 42. The exhaust opening 314 is positioned in the temporary cover 42 so that when the hood 308 is positioned over the exhaust opening 314 and connected to the temporary cover 42, the hood 308 is adjacent the lower end 220 of the loading chute 40. One end, lower extending end of duct 310 is connected to the upper portion of the hood 308 and the other end, the upwardly extending end, of the duct 310 extends upwardly from the hood 308 to the vacuum apparatus. An exhaust channel 312, formed through the hood 308 and the duct 310, is operatively connected to and in fluid communication with the exhaust opening 314 of the temporary cover 42 and the vacuum source. Thus, the exhaust channel 312 selectively establishes fluid communication between the environment immediately below the exhaust opening 314 of the temporary cover 42 and a dust collector (not shown) of the overhead storage container 14.

The load control mechanism 54 comprises a support member 316, a pivot arm 318, a follower wheel 320, a spring 322 and a control switch (not shown). The support member 316 is provided with a first end 324 and an opposed lower second end 326. The pivot arm 318 is provided with a first end 328 and an opposed second end 330. The first end 324 of the support member 316 is connected to a support (not shown) of the overhead loading apparatus 14 and the lower second end 326 of the support member 316 is pivotally connected to the first end 328 of the pivot arm 318 so that the pivot arm 318 extends horizontally away from the lower second end 326 of the support member 318 in a direction generally opposite the first direction 20. The second end 330 of the pivot arm 318 is journally connected to the follower wheel 320 and the follower wheel 320 is positioned in engaging alignment with the load control surface 70 formed on the first side 96 of the car 18.

The spring 322 is provided with a first end 332 and a second end 334. The first end 332 of the spring 322 is connected to the support member 316 at a position above the pivotable attachment of the lower second end 226 of the support member 316 to the first end 328 of the pivot arm 318, substantially as shown in the drawing, and the second end 334 of the spring 322 is connected to the pivot arm 318 at a position substantially intermediate the first end 328 and the second end 330 of the pivot arm 318.

The pivot arm 318 has a lowered first position, as depicted in FIG. 4, and a raised second position as depicted in FIGS. 1 and 3.

As previously stated, the follower wheel 320 is journally connected to the second end 330 of the pivot arm 318 and is positioned so as to be in engaging alignment with the load control surface 70 formed on the first side 96 of the car 18. The follower wheel 320 is positioned below the level of the load control surface 70 when the pivot arm 318 is in the lowered first position, and is rollingly engaged upon the load control surface 70 when the pivot arm 318 is in the raised second position. In other words, the follower wheel 320 is normally maintained in the position shown more clearly in FIG. 4. However, as the car 18 enters the loading station 16, the load control surface 70 engages the follower wheel 320 whereby the follower wheel 320 is moved to the higher second position and thus the pivot arm 318 is moved to the raised position.

The spring 322 is normally in an extended first position so that the spring 322 maintains the pivot arm 318 in the lowered first position. However, when the pivot arm 318 is moved to the raised position by contact between the follower wheel 320 of the load control mechanism 54 and the load control surface 70 formed on the first side 96 of the car 18, the spring 322 is placed in a compressed second position. When the spring 322 is in a compressed second position it tends to force the pivot arm 318 to the lowered position.

The control switch is operatively connected to a power source (not shown) and an apparatus (not shown) utilized to introduce the particulate material 12 into the flow channel 230 of the loading chute 40. The control switch has an ON first position and an OFF second position. The switch is normally maintained in the OFF position when the pivot arm 318 of the load control mechanism 54 is in the lowered position. In the OFF position the particulate material 12 is prevented from being introduced into the flow channel 230 of the loading chute 40. However, when the pivot arm 318 of the load control mechanism 52 is caused to be moved to the raised position by contact between the follower wheel 320 of the load control mechanism 54 and the load control surface 70 formed on the first side 96 of the car 18, as the car 18 moves through the loading station 16, the switch is automatically moved to the ON position and the particulate material 12 is automatically introduced into the flow channel 230 of the chute 40. The apparatus utilized to introduce the material 12 into the flow channel 230 of the chute 40 can be any suitable equipment, such as a conventional conveyor.

OPERATION OF THE LOADING SYSTEM

Before the car 18 moves into the loading station 16 and receives a load of the particulate material 12, the storage bin 126 of the car 18 is substantially empty of any material and is relatively clean and dry; the hatch doors 62 are in the closed position with the door seals 64 covering the spaces formed between adjacent hatch doors 62; the door latch assemblies 68 are in the locked position; and there is a sufficient quantity of the particulate material 12 ready to be introduced into the flow channel 230 of the loading chute 40 of the overhead loading apparatus 14. Some of the above conditions can be seen in FIG. 1 wherein the car 18 is shown as just entering the loading station 16.

Immediately after entering the loading station 16, the cover entry gate 60 strikes the first end 236 of the temporary cover 42 so that the cover entry gate 60 is moved from the closed first position to the open second position. Simultaneously therewith, the temporary cover 42 and the first and second cover seals 248 and 249 are progressively positioned within the cover-receiving opening 150 formed between the first and second side plates 142 and 144 of the car 18 and the hatch doors 62. Since the distance across the first and second cover seals 248 and 249 is slightly greater than the distance between the first and second side plates 142 and 144 of the car 18, and because of the resilient nature of the first and second cover seals 248 and 249, the first and second cover seals 248 and 249 are slightly compressed (as can be seen in FIGS. 6 and 7) as the first and second side plates 142 and 144 substantially slide over the temporary cover 42. Thus, sealed frictional engagement is formed between the first and second side plates 142 and 144 and the first and second cover seals 248 and 249.

In addition, immediately after the temporary cover 42 is positioned within the cover receiving opening 150, the first end 236 of the temporary cover 42 engages the closure flap 167 connected to the first bulkhead 122 of the storage bin 126 of the car 18. The closure flap 167 is thereby moved from the upright first position to the folded second position. As the temporary cover 42 progressively slides over the closure flap 167, the flap 167 is maintained in sealing engagement with the lower face 246 of the temporary cover 42 by the resilient nature of the closure flap 167.

After the first end 236 of the temporary cover 42 is positioned within the cover receiving opening 150 and beneath the first hatch door 62a, the load control surface followers 206 of the door latch assemblies 68 associated with the first hatch door 62a strike the latch positioning wheel 258 of the unlatching mechanism 44 so that the door latch assemblies 68 associated with the first hatch door 62a are moved from the locked position to the unlocked closed position.

After the first hatch door 62a is in the unlocked closed position, the temporary cover 42 is positioned within the cover receiving opening 150 such that the roller wheels 286 of the first roller assembly 272 engage the contoured enlargement 184 of the first hatch door 62a causing the first hatch door 62a to be pivoted slightly toward the open position. The roller wheels 286 forming portions of the other roller assemblies 272 then successively engage the contoured enlargement 184 of the first hatch door 62a so that the first hatch door 62a is being progressively moved from the closed position to the open position as the car 18 moves through the loading station 16.

The other door latch assemblies 68 associated with the hatch doors 62b–62g, are thereafter sequentially caused to be opened in a manner similar to that of the door latch assemblies 68 associated with the hatch door 62a. The hatch doors 62 are thus moved from the closed position to the open position to clear the loading chute 40. The temporary temporary cover 42 is positioned over the storage bin 126 of the car 18 to cover the storage bin 126 when the hatch doors 62 are in the open position.

When the first hatch door 62a is pivoted toward the open position, the door seals 64 associated with the first hatch door 62a and positioned over the first and second ends 172 and 174 of the first hatch door 62a are also pivoted upwardly. As the other hatch doors 62b to 62g are opened thereafter, only one of the door seals 64, namely, the door seal 64 which is positioned over the second end 174 of each hatch door 62b to 62g is pivoted upwardly with each respective hatch door 62.

As one of the hatch doors 62 is moved to the open position by the hatch door guide assembly 46, the door seal 64 associated with the respective hatch door 62 slidingly engages the hatch door positioning rail 48 near its outwardly curved first end 292. Thus, as the car 18 progresses through the loading station 16, the hatch door 62 is maintained in the open position by the hatch door guide assembly 46 and the hatch door positioning rail 48. That is, the hatch door 62 is positioned in the space formed between the hatch door positioning rail 48 and the opposed second side face 228 of the loading chute 40.

When the temporary cover 42 is positioned within the cover-receiving opening 150 such that the lower end of the flow channel 230 of the loading chute 40 is positioned over the storage bin 126, the particulate material 12 is introduced into the flow channel 230 of the loading chute 40 and thereby into the storage bin 126 of the car 18. Since the car 18 is moving in the first direction 20 through the loading station 16, it is desirable that the particulate material 12 be introduced into the flow channel 230 at a specified time before the flow channel 230 of the loading chute 40 is positioned over the storage bin 126 of the car 18 to insure a timely delivery of the particulate material into the storage bin 126.

Such can be accomplished by positioning the follower wheel 320 of the load control mechanism 54 near the arrival end of the loading station 16 so that the loading of the particulate material 12 is timed to coincide with the positioning of the storage bin 126 of the car 18 below the flow channel 230 of the loading chute 40.

After the particulate material 12 has been introduced into the flow channel 230, the particulate material 12 continues to flow through the channel 230 and into the storage bin 126 as the car 18 moves through the loading station 16. When the control switch is moved to the OFF position (e.g., the pivot arm 318 of the load control mechanism 54 is not in contact with the load control surface of the car 18 and thus the pivot arm is in the lowered position, the flow of the particulate material 12 into the flow channel 230 of the loading chute 40 is stopped, thereby insuring that the flow of the particulate material 12 is halted. Thus, the flow of the particulate material 12 through the flow channel 230 is stopped before the storage bin 126 of the car 18 moves out of position beneath the flow channel 230 of the loading chute 40.

When the car 18 nears the position shown in FIG. 3, the cover entry gate 60 and the closure flap 167 connected to the first bulkhead 122 of the storage bin 126 of the car 18 sequentially disengage from the lower face 246 of the temporary cover 42. The cover entry gate 60 moves from the open second position to the closed first position and the closure flap 167 moves from the folded second position to the upright first position.

While the particulate material 12 is being transferred into the storage bin 126 of the car 18 through the flow channel 230 of the loading chute 40, the hatch doors 62 are successively moving through the space formed between the hatch door positioning rail 48 and the loading chute 40. As was disclosed above, the door guide surface formed by the roller wheels 286 of the roller assembly 272 curves generally downwardly toward the second housing (not shown) formed through the temporary cover 42. As a hatch door 62 nears this downwardly curving portion of the hatch door guide assembly 46, the hatch door 62 is caused to be moved toward the closed position by the inwardly curving second end 294 of the hatch door position rail 48. The hatch door 62 then follows the door guide surface downwardly, under its own weight, and is again positioned in the closed position.

As each hatch door 62 moves to the closed position, the hatch door 62 will strike the hooked first end 204 of the second arm 204 the door latch assemblies 68 associated with such hatch doors 62 so that the first and second arms 202 and 204 are pivoted to permit the hatch door 62 to move to the closed position. Each of the remaining hatch doors 62 is closed in succession in a similar manner as the car 18 moves through the loading station 16.

Immediately after a hatch door 62 has been closed, the upper surface of the load control surface followers 206 of the door latch assemblies 68 associated with the closed hatch door 62 strike the latch positioning wheel 304 of the relatching mechanism 50 so that the hooked first end 203 of the arm 204 is cinched down on the lip 186 formed on the flange portion of the first side 176 of the hatch door 62. Thus, the respective door latch assemblies 68 are positioned in the locked position with the associated hatch door 62 again positioned in the locked closed position.

As the car 18 continues to move through the loading station 16, and while the particulate material 12 is still flowing through the channel 230 of the loading chute 40, the first end 236 of the temporary cover 42 eventually engages the closure flap 168 connected to the second bulkhead 124 of the storage bin 126 of the car 18. As can be seen more clearly in FIG. 4, the closure flap 168 connected to the second bulkhead 124 of the storage bin 126 of the car 18 is moved from the upright first position to the folded second position in a manner similar to that of the closure flap 167 connected to the first bulkhead 122 of the storage bin 126 of the car 18. Immediately thereafter, the first end 236 of the temporary cover 42 engages the cover exit gate 66. The cover exit gate 66 is thereby moved from the closed first position to the open second position in a manner similar to that of the cover entry gate 60.

After all of the hatch doors 62 have been positioned in the locked closed position, and as the car 18 leaves the loading station 16, the first and second side plates 144 and 154 of the car 18 substantially slide away from the temporary cover 42; and, the cover seals 248 and 249, together with the closure flap 168 connected to the second bulkhead 124 of the storage bin 126 of the car 18, disengage from the temporary cover 42 and resume a normal position. Likewise, the cover exit gate 66 disengages from the temporary cover 42 and resumes its normally closed position.

Changes may be made in the construction and the arrangement of the parts or the elements of the various embodiments as disclosed herein without departing from the spirit and scope of the invention as defined in the following claims.

What is claimed is:

1. An apparatus for protecting particulate material from the surrounding outside environment during the transfer of the material from a storage assembly to a vehicle comprising:
    a loading chute having a lower end and a channel extending therethrough, the channel being in communication with the storage assembly for transferring the particulate material from the storage assembly through the channel in the loading chute;
    a temporary cover having an upper surface, a lower surface, a first end, an opposed second end, a first side, an opposed second side, the temporary cover being connected to the lower end of the loading chute with the channel of the loading chute extending through the temporary cover;
    a body forming a portion of the vehicle having a first end, a second end, a first side, a second side, an upper side and a lower side, the body having a storage bin formed therein and the upper side of the body having a material receiving opening therein communicating with the storage bin;
    a first cover assembly, comprising:
        at least one hatch door having a first side, an opposed second side, a first end and an opposed second end, the hatch doors being connected to the body of the vehicle and positioned so that the hatch doors cover the material receiving opening of the body of the vehicle in a closed first position, the hatch doors each being movable from the material receiving opening in the body of the vehicle to an opened second position, a cover receiving opening being formed between the hatch door and the storage bin in the closed position of the hatch door for receiving the temporary cover; and
        means for moving the hatch doors from the closed first position to the opened second position and for moving the hatch doors from the opened second position to the closed first position, the hatch door being adapted to be positioned above the storage bin, the temporary cover and the means for moving the hatch doors from the closed first position to the opened second position cooperating to position at least a portion of the temporary cover in the cover receiving opening between the storage bin of the vehicle and the hatch door prior to the hatch door being moved from the closed first position to the opened second position, the temporary cover being positioned over and covering a portion of the storage bin of the vehicle covered by the hatch door in the closed first position of the hatch door thereby covering the storage bin of the vehicle prior to the hatch door being moved to the opened second position, the particulate material being transferrable from the overhead storage bin to the storage bin of the vehicle via the channel in the chute while the temporary cover covers the storage bin of the vehicle.

2. The apparatus of claim 1 wherein the storage assembly is an overhead storage assembly and wherein the loading chute extends downwardly from the overhead storage assembly to a predetermined level above the vehicle.

3. The apparatus of claim 1 wherein the upper side of the body of the vehicle comprises:
    a first end ceiling member extending between the first and second sides of the body, the first end ceiling member being positioned near the first end of the body;
    a second end ceiling member extending between the first and second sides of the body, the second end ceiling member being positioned near the second end of the body;
    a first side ceiling member extending between the first end ceiling member and the second end ceiling member, the first side ceiling member sloping a distance inwardly and upwardly from an uppermost portion of the first side of the body;
    a second side ceiling member extending between the first end ceiling member and the second end ceiling member, the second side ceiling member sloping a distance upwardly and inwardly from the uppermost portion of the second side of the body;
    a first side plate connected to an uppermost portion of the first side ceiling member, the first plate extending longitudinally substantially the length of the first side ceiling member;
    a second side plate connected to an uppermost portion of the second side ceiling member, the second side plate extending substantially the length of the second side ceiling member; the first end ceiling member, the second end ceiling member, the first side ceiling member, and the second side ceiling member cooperating to form the upper side of the vehicle and form a second cover assembly receiving opening therein.

4. The apparatus of claim 3 which further includes a cover entry gate pivotally connected to the first end ceiling member at a position between the first and second side plates, the cover entry gate having a normally closed first position and an opened second position, the cover entry gate having a length approximately equal to the distance between the first and second side plates, the cover entry gate in the closed first position closing one end portion of the second cover assembly receiving opening in the upper side of the vehicle.

5. The apparatus of claim 4 wherein the cover entry gate comprises:
   a member having a first end and an opposed second end, the first end of the member being pivotally attached to the first end ceiling member of the body generally between the first and second side plates of the body, so as to extend upwardly therefrom so that the second end of the member is operatively engagable with the door sealing member of the hatch door; and
   a spring operatively connected to the first end of the member so as to maintain the member in a closed first position and upon engagement of the member with the temporary cover to move the member to the opened second position.

6. The apparatus of claim 4 which further includes a cover exit gate pivotally connected to the second end ceiling member at a position between the first and second side plates, the cover exit gate having a normally closed first position and an opened second position, the cover exit gate having a length approximately equal to the distance between the first and second side plates, the cover exit gate in the closed first position closing one end portion of the second cover assembly receiving opening in the upper side of the vehicle.

7. The apparatus of claim 6 wherein the cover exit gate comprises:
   a member having a first end and an opposed second end, the first end of the member being pivotally attached to the second end ceiling member of the body generally between the first and second side plates of the body, so as to extend upwardly therefrom so that the second end of the member is operatively engageable with the door sealing member of the hatch door; and,
   a spring operatively connected to the first end of the member so as to maintain the member in a closed first position and upon engagement of the member with the temporary cover to move the member to the opened second position.

8. The apparatus of claim 1 wherein the body of the vehicle is further provided with a load control surface formed along an uppermost portion of the first side wall of the body, the load control surface extending the length of the first side wall and wherein the apparatus further includes:
   a support member having a first end and an opposed second end, the first end of the support member being connected to the overhead loading apparatus;
   a pivot arm having a first end and an opposed second end, the first end of the pivot arm being pivotably connected to the opposed second end of the support member so that the pivot arm extends away from the lower second end of the support member;
   a follower wheel operatively connected to the second end of the pivot arm, the follower wheel being positioned in engaging alignment with the load control surface formed on the first side of the vehicle;
   a spring having a first end and a second end, the first end of the spring being connected to the support member at a position above the pivotal attachment of the opposed second end of the support member to the first end of the pivot arm, the second end of the spring being connected to the pivot arm at a position substantially intermediate the first end and the second end of the pivot arm, said pivot arm having a lower first position and a raised second position, the support member, the pivot arm, the follower wheel and the spring cooperating to provide a means for indicating when the vehicle is positioned with respect to the loading chute for receiving the particulate material.

9. The apparatus of claim 1 which further includes a door latch assembly operatively connected to the hatch door for securing the hatch door in a closed position, the door latch assembly comprising:
   a load control follower operably engagable with one of a hatch door unlatching assembly and a hatch door latching assembly;
   a support post connected to the first side and near the upper side of the vehicle so as to extend generally perpendicularly and outwardly from the first side;
   a first arm having a first end and an opposed second end, the first end pivotably connected to the load control follower, the opposed second end pivotably connected to the support post such that a portion of a pivot means employed to pivotally connect the opposed second end of the first arm to the support post extends a distance from the opposed second end portion of the first arm; and
   a second arm having a hooked first end, an opposed second end, and a recessed portion formed in one side portion, the opposed second end portion of the second arm pivotally connected to the opposed second end portion of the first arm such that the recessed portion of the second arm engages the portion of the pivot means extending from the opposed second end of the first arm, the hooked first end of the second arm operatively connectable to each hatch door to maintain the hatch door in a closed first position.

10. The apparatus of claim 9 wherein the unlatching assembly is defined further as being for moving the door latch assembly from a first locked position to an unlocked second position, the unlatching assembly comprising: a brace supportive frame operatively connected to the temporary cover near a medial portion of the first side of the temporary cover so that a portion of the brace supportive frame extends outwardly and away from the firs- side of the temporary cover and maintained therein in a cantilever manner; an extension arm secured to and extending away from the cantilevered portion of the brace supportive frame, the extension arm being maintained in a parallel spaced apart relationship with the first side of the temporary cover and extending towards the first end of the temporary cover; and a latch positioning wheel operatively connected to the extension arm at a predetermined position near the first end of the temporary cover, the latch positioning wheel being positioned for engaging alignment with the load control follower of the door latch assembly.

11. The apparatus of claim 9 which further includes a hatch door positioning rail having an outwardly curved first end, an inwardly curved second end, and a relatively straight horizontally disposed medial portion extending between the first and second ends, the hatch door positioning rail being supported in a stationary position a distance above the temporary cover and a distance from the second side face of the loading chute by a plurality of rigid strut members secured to the loading chute.

12. The apparatus of claim 11 which further includes a relatching assembly operatively connected to the second end of the temporary cover, the relatching assembly comprising:
    a frame connected to the upper face of the temporary cover adjacent the first side of the cover so that a portion of the frame extends from the first side of the cover in a substantially cantilever manner;
    an extension arm having a first end and a second end, the first end of the extension arm being secured to the cantilevered portion of the frame so that the arm extends in a parallel, spaced apart relationship with the first side of the temporary cover in a direction towards the second end of the temporary cover; and,
    a latch positioning wheel operatively connected to the extension arm near the end of the extension arm opposite the frame, the wheel being positioned for engaging alignment with the load control follower of the door latch assembly.

13. The apparatus of claim 12 wherein the temporary cover further includes:
    a first cover seal operatively connected to the first side of the temporary cover; and
    a second cover seal operatively connected to the opposed second side of the temporary cover, the first and second cover seal extending the length of the temporary cover between the first end and the opposed second end of the temporary cover and adapted for slidable, sealing engagement with the vehicle when the temporary cover is positioned over the material receiving opening in the vehicle.

14. The apparatus according to claim 13 wherein the first and second cover seals are formed of a resilient material and wherein the first and second cover seals provide the temporary cover with a width slightly greater than the width of the material receiving opening of the vehicle.

15. The apparatus of claim 1 wherein the lower end portion of the loading chute is defined further as being connected to a medial portion of the temporary cover with the flow channel of the loading chute extending through the temporary cover.

16. The apparatus of claim 1 wherein the means for moving the hatch door to the opened second position is defined further to include a hatch door guide assembly comprising:
    a supporting frame having a first end, a second end and an outer face, the first end of the frame being connected to the upper surface of the temporary cover and the loading chute, the second end of the frame being connected to the upper surface of the temporary cover and the loading chute, so that the supporting frame extends upwardly in a curved manner between the first and second ends of the frame so as to facilitate and to be compatible with the opening and closing of the hatch doors; and
    a plurality of roller assemblies, the roller assemblies including:
        a plurality of support plates; and
        a plurality of roller wheels, the support plates being secured in a parallel, spaced apart relationship to the outer face of the support frame and the roller wheels are positioned between and operatively connected to the support plates.

17. The apparatus of claim 1 wherein the body of the vehicle further includes:
    a first bulkhead and a second bulkhead, the bulkheads being secured to the first and second sides of the body so as to be disposed therein in a spaced apart relationship, the first and second bulkheads, the first and second sides sides and the lower side of the body cooperating to define the storage bin of the vehicle.

18. The apparatus of claim 17 which further includes a closure flap formed of a resilient material, the closure flap having a first end and an opposed second end, the first end of the closure flap being connected to an upper portion of the first bulkhead so that the second end portion extends a distance upwardly into and transversely across the second cover receiving opening, the closure flap being aligned with the temporary cover for engagement with the temporary cover so that as the vehicle moves into the loading station the closure flap engages the temporary cover and is thereby moved from a first upright position to a second folded position to assist in the sealing of the storage bin of the vehicle from the surrounding environment.

19. The apparatus of claim 18 which further includes a second closure flap formed of a resilient material, the second closure flap having a first end and an opposed second end, the first end of the second closure flap being connected to an upper portion of the second bulkhead so that the second end portion extends a distance upwardly into and transversely across the second cover receiving opening, the second closure flap being aligned with the temporary cover for engagement with the temporary cover so that when the second closure flap engages the temporary cover the second closure flap is moved from a first upright position to a second folded position to assist in the sealing of the storage bin from the surrounding environment.

\* \* \* \* \*